United States Patent [19]
Kanai et al.

[11] Patent Number: 5,616,978
[45] Date of Patent: Apr. 1, 1997

[54] ELECTROCONDUCTIVE ARTICLE, HAVING PORTIONS WITH VARIABLE RESISTANCE AND A ROTOR PRODUCED THEREFROM

[75] Inventors: Hitoshi Kanai, Tokyo; Masashi Takahashi; Yoshiyasu Itoh, both of Kanagawa-ken, all of Japan

[73] Assignee: Kabushiki Kaisha Toshiba, Kawasaki, Japan

[21] Appl. No.: 26,043

[22] Filed: Mar. 5, 1993

[30] Foreign Application Priority Data

Mar. 6, 1992 [JP] Japan ..................................... 4-048979

[51] Int. Cl.$^6$ ................................................. H02K 17/16
[52] U.S. Cl. ........................ 310/211; 310/201; 310/261; 310/195; 310/72; 338/103; 338/295; 174/126.2
[58] Field of Search ................................ 310/201, 208, 310/72, 44, 262, 211, 195, 261; 338/13, 103, 89, 122, 138, 295; 336/222; 174/126.2

[56] References Cited

U.S. PATENT DOCUMENTS

| | | | |
|---|---|---|---|
| 2,487,839 | 11/1949 | Van Alen | 338/295 |
| 3,622,944 | 11/1971 | Tsuchiya | 439/179 |
| 3,764,726 | 10/1973 | Kohler et al. | 174/15.3 |
| 4,132,910 | 1/1979 | Kiss et al. | 310/44 |
| 4,283,704 | 8/1981 | Ohtani et al. | 338/138 |
| 5,167,813 | 12/1992 | Iwata et al. | 210/219 |
| 5,206,623 | 4/1993 | Rochette et al. | 338/295 |
| 5,293,148 | 3/1994 | Hancock | 338/295 |
| 5,294,769 | 3/1994 | Nishi et al. | 219/117.1 |
| 5,455,000 | 10/1995 | Seyferth et al. | 419/36 |

FOREIGN PATENT DOCUMENTS

| | | |
|---|---|---|
| 58-103561 | 7/1983 | Japan. |
| 58-103562 | 7/1983 | Japan. |
| 59-198858 | 11/1984 | Japan. |
| 60-119882 | 8/1985 | Japan. |
| 61-52478 | 4/1986 | Japan. |

OTHER PUBLICATIONS

Itoh & Kashiwaya, "Residual Stress Characteristics of Functionally Gradient Materials", *Journal of the Ceramic Society of Japan*: 100 [4]476–481 (1992).

*Primary Examiner*—Steven L. Stephan
*Assistant Examiner*—Judson H. Jones
*Attorney, Agent, or Firm*—Foley & Lardner

[57] ABSTRACT

An electroconductive material has at least one portion in which the electrical resistance varies continuously along a gradient. Accordingly, since the material is not formed by directly bonding different elements, it does not have a weak joint portion. Further, since other material characteristics besides electrical resistance also vary along a gradient, for instance, when the material is used at a high or low temperature, a large thermal stress does not generate at an interface between different elements of the material due to a difference of thermal expansion coefficients of such elements. A motor uses the above electroconductive material as a conductor provided in a plural slots. Consequently, starting characteristics of the motor are improved due to the skin effect, and internal stress of the motor due to the thermal expansion of the conductor is decreased. Moreover, the reliability of the motor is improved.

13 Claims, 7 Drawing Sheets

| | DIFFUSION COEFFICIENT $(cm^2/S)$ | MEASUREMENT TEMPERATURE (°C) |
|---|---|---|
| DIFFUSION OF NICKEL IN COPPER | 2.70 | 700 ~ 1050 |
| DIFFUSION OF COPPER IN NICKEL | 2.57 | 1054 ~ 1359 |

ELECTROCONDUCTIVE ARTICLE, HAVING PORTIONS WITH VARIABLE RESISTANCE AND A ROTOR PRODUCED THEREFROM

BACKGROUND OF THE INVENTION

1. Field of the Invention

This invention relates to electroconductive materials or articles, such as functionally gradient materials, in which electrical resistance varies along a continuous gradient, to a method of producing the electroconductive materials or articles, and to a motor produced by the electroconductive material.

2. Description of the Related Art

Functionally gradient material is one kind of electroconductive material. The functionally gradient material is used under severe circumstances, such as space planes, fusion reactors and so on. The functionally gradient material combines together plural kinds of material having different functions. In these materials, the composition gradient of the plural materials varies over a certain portion of an article produced.

For instance, an example of an application of a functionally gradient material developed by the assignee of the present application is disclosed by "Residual Stress Characteristics of Functionally Gradient Materials" (Journal of the Ceramic Society of Japan 100[4] 476–481 (April 1992)). The combination of materials of the functionally gradient material disclosed in the above publication comprises a ceramic and metal having a very good ability to reduce thermal stresses due to temperature differences and/or different material constants. The material system used there prevents the original composition form of functionally gradient material from changing due to diffusion under high temperature.

One method of producing the functionally gradient material having a good ability to reduce thermal stresses is a method of stacking material so as to change the composition, such as a sintering technique which comprises the steps of grading the powders, stacking, forming and sintering. Another method is the thermal spraying method, and so on.

However, in the functionally gradient material produced by the method described above, though the composition changes continuously, in a broad view, interfaces between different kinds of material and air holes exist in the functionally gradient material, in a narrow view. Consequently, it is difficult to produce an article with properties such as electrical resistance which do not change sharply due to the difference of the composition and the existence of air holes.

Further, a deep-slot squirrel-cage rotor is known for an induction motor of the type which is disclosed in Earlier Japanese Laid-open Utility Model Publications Sho. 58-103561, 58-103562, 60-119882 and 61-52478 and Earlier Japanese Laid-open Patent Publication Sho. 59-198858. These deep-slot squirrel-cage rotors comprise at least two kinds of electrical conductors. In more detail, the upper portion of the squirrel-cage rotor is produced from a high resistance electrical conductor, and the lower portion of squirrel-cage rotor is produced from a low resistance electrical conductor. The upper portion and lower portion are joined. Accordingly, the deep-slot squirrel-cage rotor has characteristics similar to a double squirrel-cage rotor. The deep-slot squirrel-cage rotor is devised to increase the heat capacity of the electrical conductor.

However, the current value and the calorific value at the upper portion are different from those at the lower portion. Consequently, since differences of thermal elongation stress are caused between the upper portion and the lower portion, it is easy for cracks to be formed in the joined interface between the upper portion and the lower portion when the induction motor is used for repeated starting at high frequency.

SUMMARY OF THE INVENTION

It is therefore one object of the present invention to provide an electroconductive material, and preferably an electroconductive material useful in electric motors.

It is a further object of the invention to provide a method of producing the electroconductive material in which electrical resistance varies gradually along the material.

It is another object of the present invention to provide a motor using an electroconductive material which can improve the starting characteristics of the motor.

In accomplishing the above objects, there is provided according to one aspect of the invention, an electroconductive material comprising at least one portion in which electrical resistance varies gradually along one dimension. The material is preferably in the form of an electroconductive article wherein the article comprises a first region, a second region and a third region located between said first and second regions, and wherein the third region is comprised of a plurality of different alloy materials.

According to a further aspect of the invention, there is provided a method of producing an electroconductive material comprising the steps of producing plural alloy materials by adding respective different amounts of an additive to an electroconductive base material; overlapping the produced plural alloy materials; and forming the overlapped materials into one body by plastic processing and/or heat treatment.

In an alternative embodiment, the process comprises the steps of producing plural alloy materials by adding respective different amounts of an additive to a base material; overlapping the produced plural alloy materials in a preselected pattern; shaping the overlapped plural alloy materials; and hardening the formed plural alloy material by sintering.

To achieve other objects according to the invention, there is provided a motor comprising a rotor core having plural slots formed in an outer portion of the rotor core; and a conductor provided in the plural slots respectively; wherein a central portion between an upper portion of the conductor and a lower portion of the conductor has an electrical resistance that varies gradually in the direction between the upper and lower portions.

Further objects, features and advantages of the present invention will become apparent to those skilled in the art from the detailed description of preferred embodiments set forth below, when considered together with the attached drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

FIG. 1 through FIG. 5 show an electroconductive material and a method of producing the electroconductive material according to a first embodiment of the invention.

Figure 1:
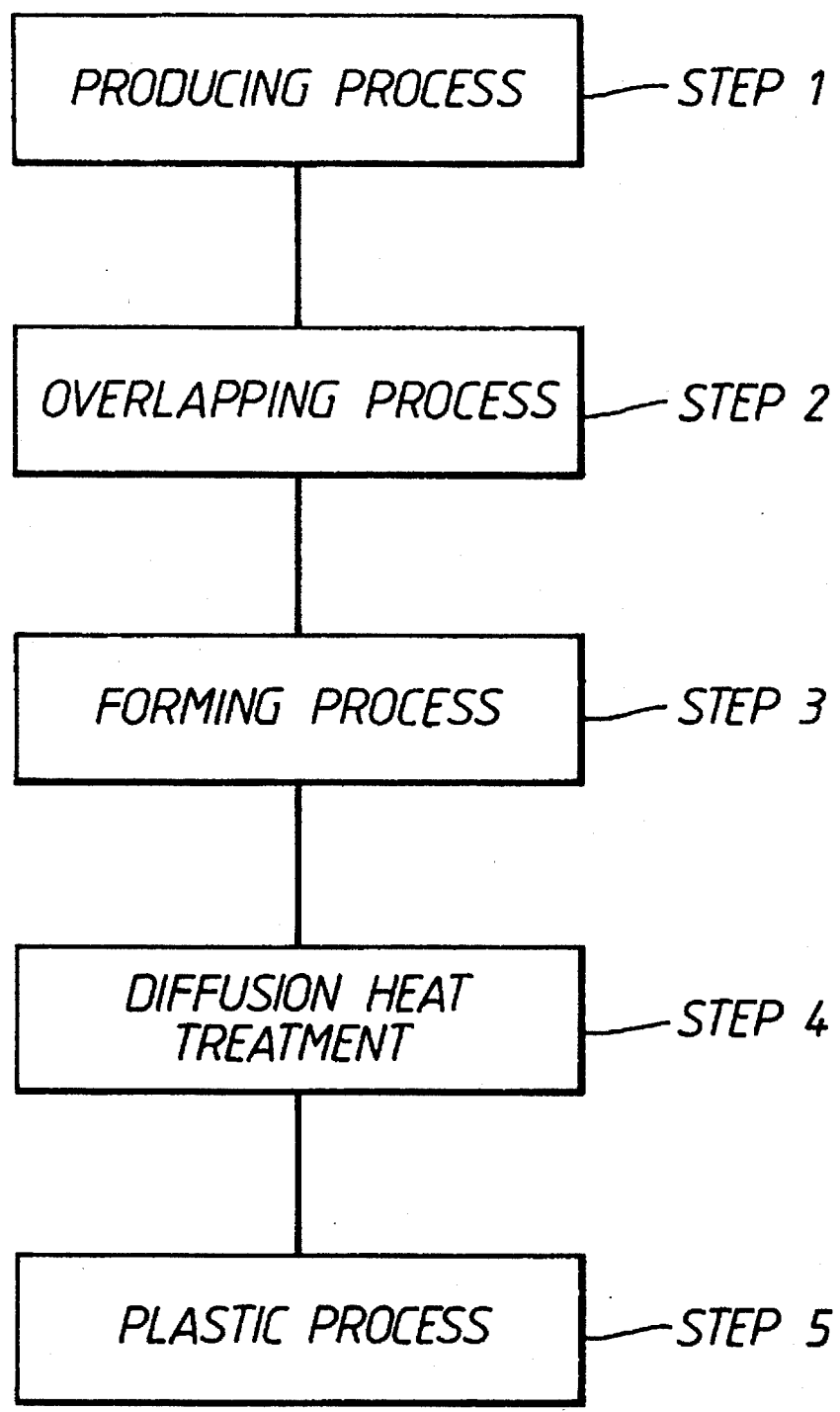
FIG. 1 is a process chart illustrating the method of producing an electroconductive material according to one embodiment of the invention.

Referring to FIG. 1, copper having a low electrical resistance is used as a base material, nickel is used as an additive, and several electroconductive alloy materials are produced wherein the electrical resistance changes gradually from material to material.

In step 1 of FIG. 1, plural materials made of alloyed copper and nickel are preferably produced by the vacuum dissolution method. The amount of nickel contained in each successive one of the alloy materials is different.

In step 2 of FIG. 1, the materials are overlapped or stacked in the order of less nickel contained in the material. Thus, there are at least four layers of material typically, i.e., the two layers to be joined to one another and at least two intermediate layers formed of alloys having different compositions. Of course, it may be desirable to have more than two intermediate layers, e.g., up to 5 or 10, or sometimes more than 10.

In step 3 of FIG. 1, the overlapped materials are preferably formed into one body by hot working. At this time, the content of nickel changes discontinuously in a stepwise fashion, but the copper and nickel alloy forms one body. The alloy is based on copper, and the content of nickel changes gradually, when viewed in a broad sense.

In step 4 of FIG. 1, the alloy formed as one body is given a heat treatment, and the nickel and copper are mutually diffused. Accordingly, the portions in which the content of nickel changes discontinuously in a stepwise fashion are improved, and the composition gradient of copper and nickel which are contained in the alloy takes on a more continuous characteristic. The heat treatment step is carried out at a temperature that is below the melting point of the alloy and base materials. For example, in the case of copper as the base material, an appropriate range is between 300° and 900° C. It is preferred to carry out the heat treatment in the upper portion of the range.

In step 5 of FIG. 1, the copper and nickel alloy obtained from step 4 is plasticly worked such as by forging, rolling, extruding or drawing. According to the plastic working, the characteristics of the materials of the alloy can be made more stable, and the alloy can be formed and shaped exactly.

Figures 2, 3:
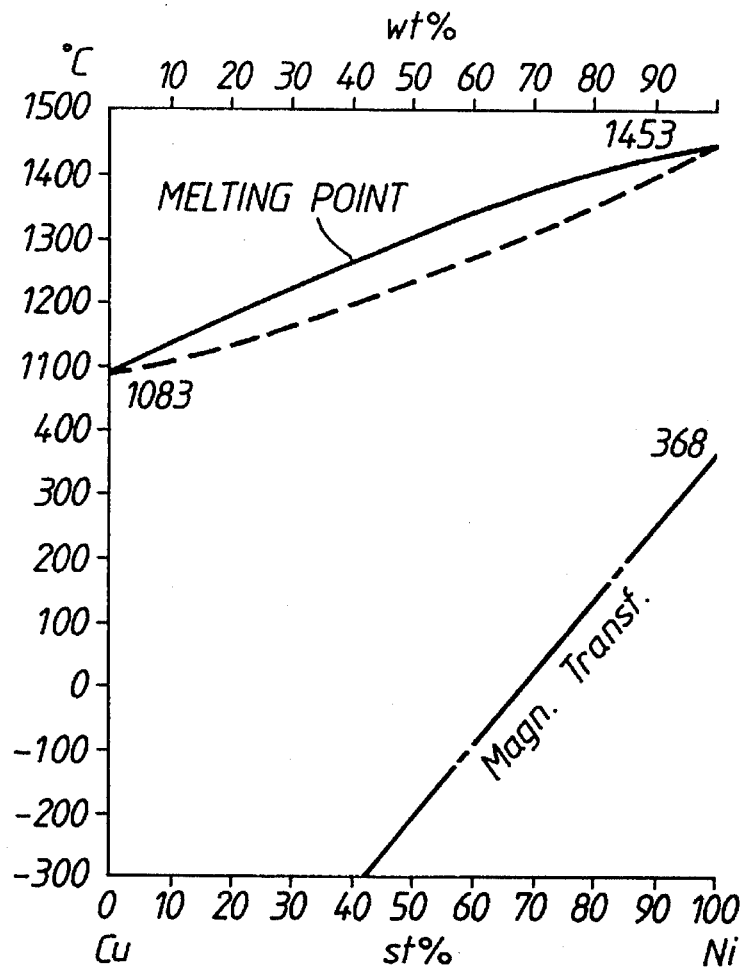
FIG. 2 is a graph showing properties of a copper and nickel alloy.
FIG. 3 is a table showing the diffusion coefficient of nickel in copper and the diffusion coefficient of copper in nickel.

The production of the plural materials of alloyed copper and nickel in step 1 is done in a crucible which is made from a chemically stable material such as alumina or the like. Accordingly, it is possible to dissolve copper and nickel uniformly into one another under vacuum conditions without impurities. This causes the material to be formed of equally solid solved elements, as shown in FIG. 2. Consequently, it is possible to produce a material having uniform quality by only heat-treatment. The temperature of heat-treatment is equal to or more than the melting point of the material.

The overlapping or stacking of the plural alloy materials in step 2 employs clean surfaces of the plural materials of alloyed copper and nickel produced by step 1, in order to clear away any obstacle to diffusion of the elements, such as oxides and the like. After that, hot working such as HIP (Hot Isostatic Pressure) joining, rolling, extruding and so on is done.

According to step 3, as hot working such as HIP, rolling, extruding and so on is used, a diffusion layer is formed at the interfaces between different materials. Consequently, the materials are joined strongly to each other.

The above process can be also done by a coating method such as the thermal spraying or overlay welding method.

In step 4, diffusion heat treatment is used. When a concentration gradient exists in at least two elements of one material, the diffusion heat treatment is used to cause the elements to diffuse mutually to remove the concentration gradient.

FIG. 3 shows the diffusion coefficient of nickel in copper and the diffusion coefficient of copper in nickel. In a copper-nickel system, the nickel diffuses in the copper relatively at 2.13 cm$^2$/s, which is a diffusion speed, namely a difference between the diffusion coefficient of nickel in copper and the diffusion coefficient of copper in nickel.

Figure 4:
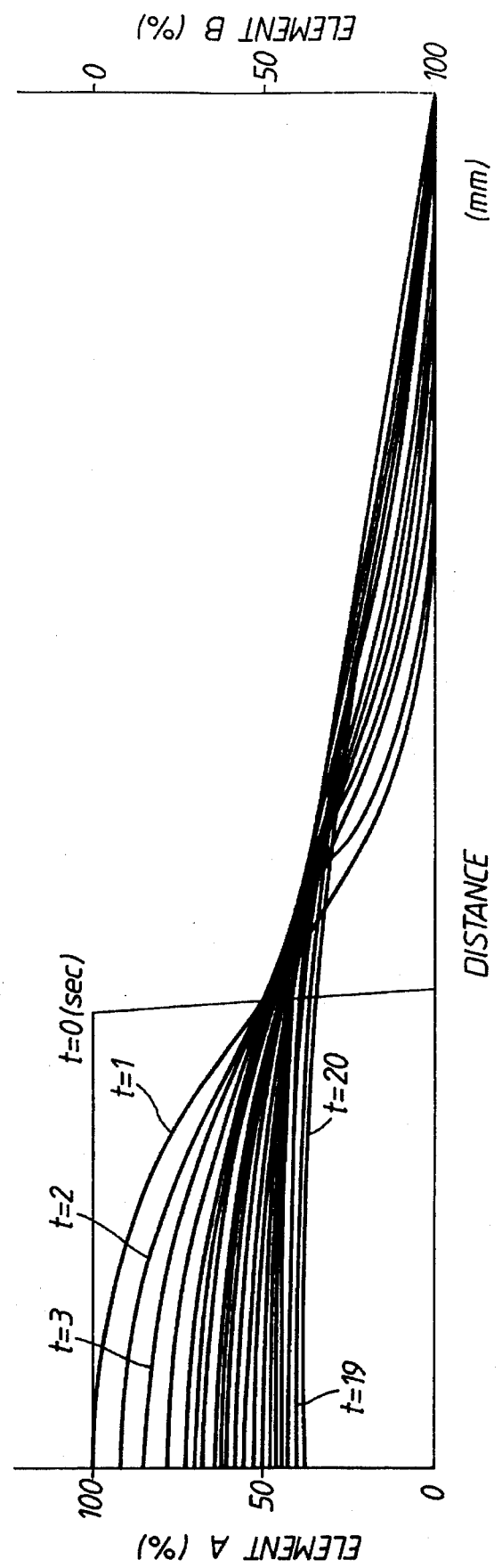
FIG. 4 is a graph showing the diffusion state near a boundary between two elements which are proportional solid solutions.

FIG. 4 shows a diffusion condition described above. The diffusion condition indicates how a material which is comprised of elements A and B at time t=0 changes due to element diffusion as time goes by. In FIG. 4, the concentration gradient of the element decreases as time goes by, and the interface between the elements disappears. Accordingly, depending on the alloy materials selected, the temperature and time for the heat treatment can be chosen in order to have the composition of the material change gradually and uniformly. Heat treatment times are preferably less than 1 minute, but can be longer depending on the temperature change.

In step 5, it is possible to stabilize the characteristics of the material and to form and shape the material exactly due to the plastic working, such as forging, rolling, extruding, drawing and the like. As the process steps from step 3 to step 5 use heat, it is possible for all process steps to be achieved by one process step in which the extruding is done, while joining and the diffusion heat working takes place at the same time.

The material made by the above processes, according to one embodiment of the invention, is characterized by effects described below.

Figure 5:
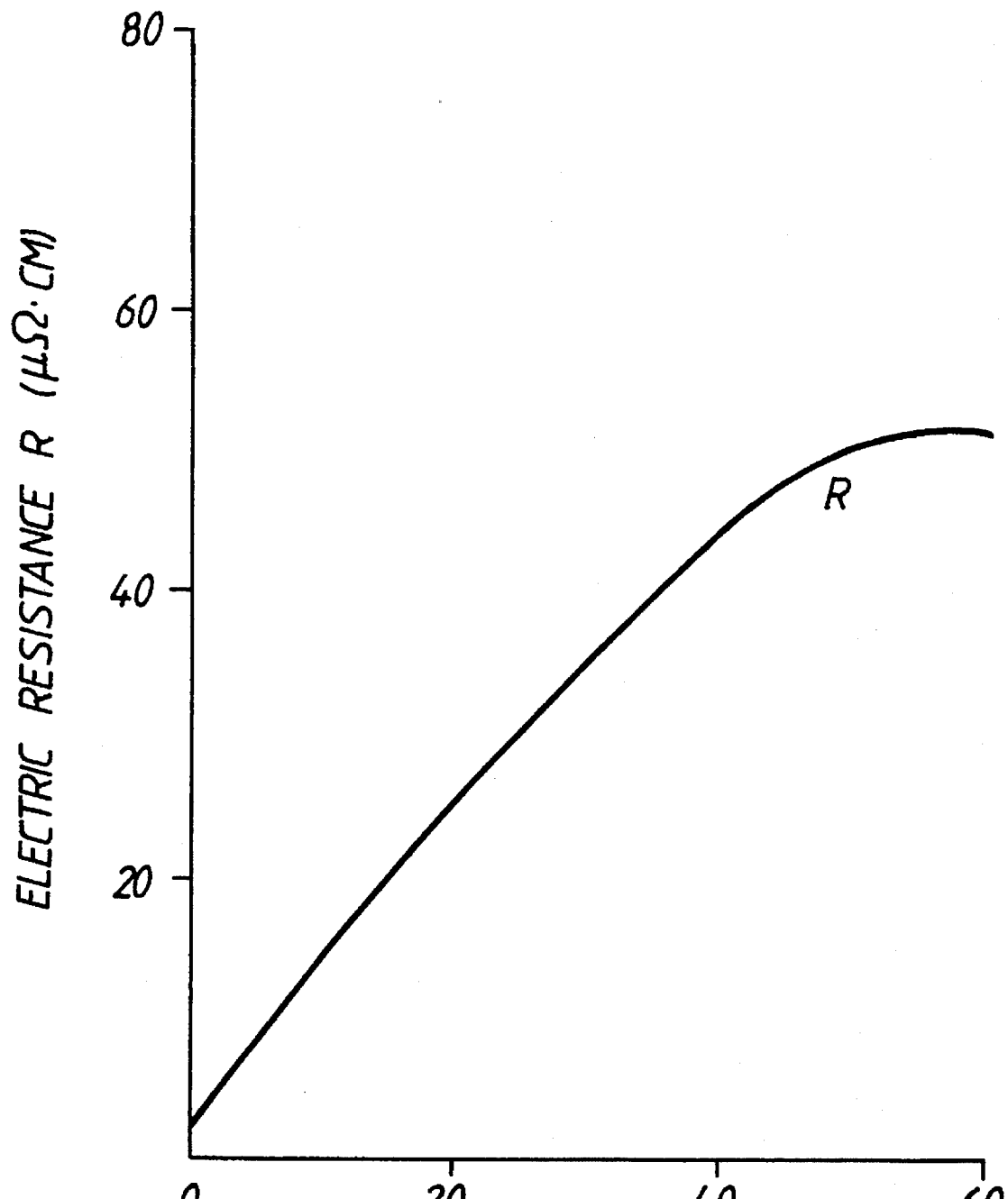
FIG. 5 is a graph showing the relation between nickel content of a copper and nickel alloy and electrical resistance.

(1) As the electric resistance of the copper and nickel alloy changes gradually due to the change in the content of nickel as shown in FIG. 5, the electroconductive material formed is characterized by an electrical resistance that varies continuously. Namely, the electrical resistance at one side of the material is larger than at the other side. Further, the electrical resistance between the one side and the other side varies continuously.

(2) Since this material is not formed as a bond between different elements directly, it does not have a weak juncture portion.

(3) Since this material also varies in its other material properties besides the electrical resistance. For example, when the material is used at a high or low temperature, a large thermal stress is not generated at an interface between different elements of the material due to a difference of thermal expansion coefficients of the elements.

Although, in the above embodiment, copper is used as the base material and nickel is used as the additive, any electroconductive material such as silver, copper, aluminum and so on may be used as the base material, and any solid solution material such as nickel, zinc, silicon and so on may be used as the additive.

When a solid nonsolution material such as aluminum oxide ($Al_2O_3$), zirconium oxide ($Z_rO_2$) and so on is added to an electroconductive base material such as silver, copper, aluminum and so on, diffusion does not take place readily. Consequently, when the above type of electroconductive material is produced in which the electrical resistance varies continuously, the above step 4 is omitted and the alloy produced by step 2 is overlapped in very fine steps, i.e., having a larger number of small concentration differences.

EXAMPLE

A deep-slot squirrel-cage induction motor using the electroconductive material produced by the above described preferred embodiment will be described with reference to FIGS. 6 through 9.

Figure 6:
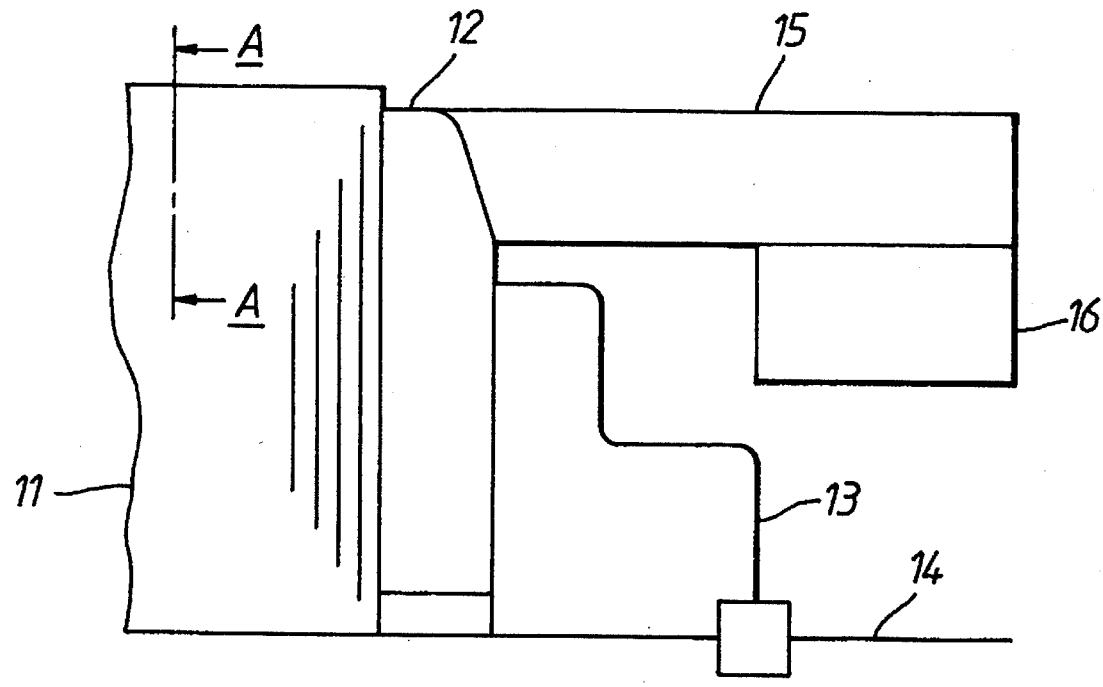
FIG. 6 is a side view illustrating one end portion of a deep-slot squirrel-cage induction motor using an electroconductive material according to one embodiment of the invention.
Figure 7:
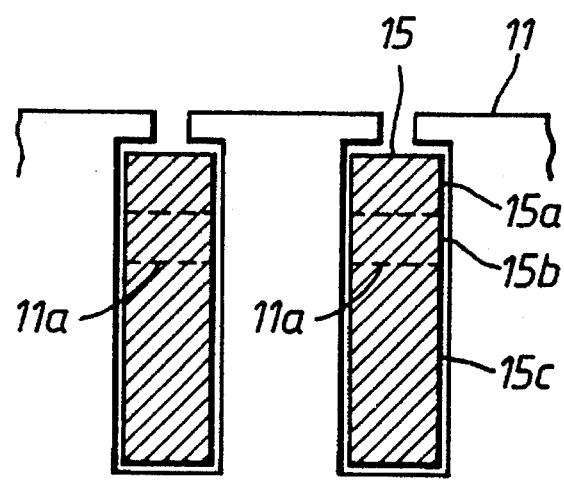
FIG. 7 is a sectional view taken along line A-A of FIG. 6.

Referring to FIG. 6, a rotor core 11 is pressed and supported by a supporting leaf 12 and a rotor flange 13, and is fixed to a rotation axis 14. As shown in FIG. 7, rotor bars 15 are provided in plural slots 11a respectively, which are formed in the rotor core 11. An end portion of the rotor bar 15 is connected to an end ring 16, and the whole circumference of the rotor bar 15 is short-circuited.

In FIG. 7, the electrical resistance of an upper portion 15a of the rotor bar 15 is higher than the electrical resistance of a lower portion 15c of the rotor bar 15. A middle portion 15b of the rotor bar 15 is formed in which the electric resistance varies continuously over the length of the portion. The rotor bar 15 is formed as one body.

Figure 8:
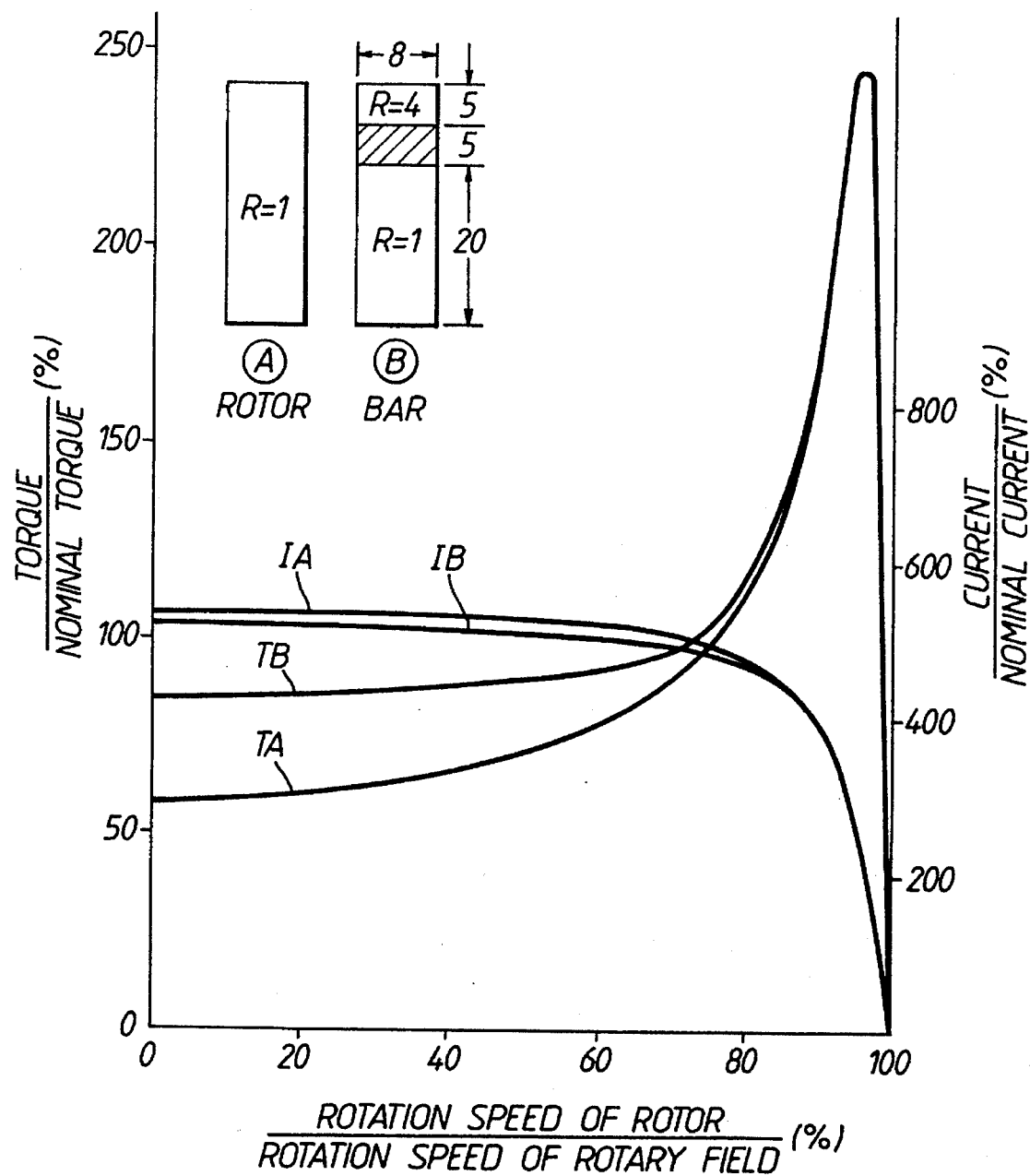
FIG. 8 is a graph showing the characteristics of a squirrel-cage induction motor using an electroconductive material according to one embodiment of the invention and a prior art squirrel-cage induction motor.

FIG. 8 shows a comparison of characteristics between a motor using the rotor bar (B) as the rotor bar 15 shown in FIG. 7 and a motor using the prior art rotor bar (A). The size of the rotor bar (B) is 8 mm wide and 30 mm long.

The electrical resistance of the upper portion 15a, shown in FIG. 7 which is 5 mm long from one edge and comprises a 9:1 Cu:Ni alloy, is four times as large as the electrical resistance of copper. The lower portion 15c, shown in FIG. 7 which is 20 mm long from the other edge and comprises copper, has the electrical resistance of copper. The electrical resistance of the middle portion 15b, shown in FIG. 7 which is 5 mm long changes linearly. The middle portion 15b shown in FIG. 7 is made up of five alloy layers, each 1 mm thick, having the following compositions (from upper to lower):

|     | 15a       |       |           |
| --- | --------- | ----- | --------- |
|     | Alloy # 1 | Cu:Ni | 9.05:0.95 |
|     | Alloy # 2 | Cu:Ni | 9.10:0.90 |
| 15b | Alloy # 3 | Cu:Ni | 9.15:0.85 |
|     | Alloy # 4 | Cu:Ni | 9.20:0.80 |
|     | Alloy # 5 | Cu:Ni | 9.25:0.75 |
|     | 15c       |       |           |

As compared with the prior art, a torque characteristic $T_B$ of this embodiment increases sharply in the low speed area. Conversely, a current characteristic $I_B$ of this embodiment decreases in the low speed area. Accordingly, the starting characteristic is improved. This means that the slip frequency becomes high in the low speed area, the leakage flux in the inside of the slot increases, the flux interlinks to incline the upper portion of the rotor bar, and the current flowing in the upper portion of the rotor bar acts as an active secondary current. This is due to the skin effect. Namely, due to the skin effect, the more the electrical resistance of the upper portion of the rotor bar increases, the better the initial torque characteristics become.

Accordingly, when the motor is started, as the primary current decreases and the starting torque increases, the starting characteristics can be improved without change in the stationary operation characteristics.

Further according to this embodiment, by eliminating a portion in which heat resistance and thermal expansion coefficient change suddenly, it is possible to decrease the internal thermal stress, and the mechanical reliability can be improved.

In this embodiment, the electrical resistance of the upper portion 15a is four times as large as the electrical resistance of the lower portion 15c, but the number of the multiple can be determined in response to the characteristics of the motor.

Figure 9A:
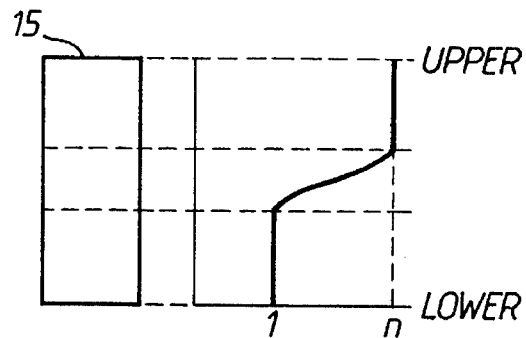
FIGS. 9(a) through FIG. 9(d) are views illustrating shapes of the rotor bars for other embodiments of the invention and changes of electrical resistance of them.
Figure 9B:
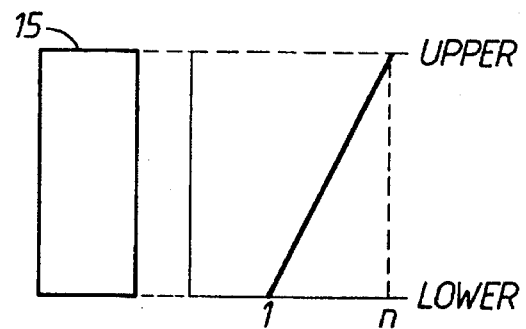
Figure 9C:
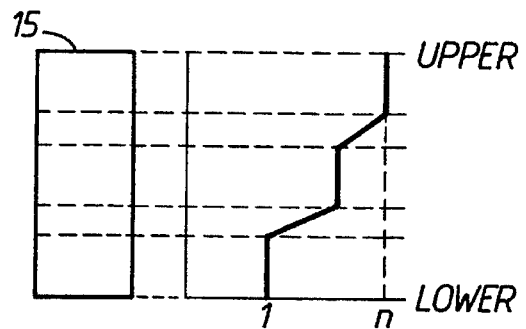
Figure 9D:
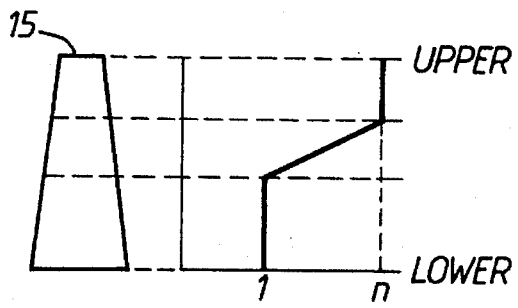

As shown in FIGS. 9(a) through (c), the distribution of the composition from the lower portion to the upper portion of the rotor bar can be formed by selecting various optional patterns. Further, as shown in FIG. 9(d), the shape of the rotor bar can be changed in response to the characteristics of the motor. In FIG. 9(d), the shape is a trapezoid. Moreover, the induction motor of this embodiment can achieve the same starting characteristics as a double squirrel-cage induction motor, and the motor of this embodiment can be made more compact because it is possible to shorten the tooth portion of the rotor compared to the double squirrel-cage induction motor. Moreover, as running efficiency can be improved during stationary running and the heat capacity of the rotor bar which contributes when a motor is started can be increased, a motor capable of repeated starting with high frequency can be provided.

As described above, according to this invention, the effects described below are obtained.

(1) With the electroconductive material of this invention, since the electrical resistance along the cross section of the electroconductive material can be formed in any desired pattern, it is possible to distribute the electrical current density as desired.

(2) According to the method of producing an electroconductive material according to this invention, it is possible to produce a conductor in which the gradient of the composition of the material is distributed according to any desired pattern and the electrical resistance is changed accordingly, as one electroconductive material. Further, an electroconductive material capable of controlling the internal stress due to the thermal expansion can be obtained.

(3) In a motor using the electroconductive material of this invention, starting characteristics can be improved, and internal stress of the motor due to thermal expansion of the rotor conductor can be decreased. Consequently, a motor in which the reliability is improved can be obtained.

What is claimed is:

1. An electroconductive article, comprising:
   at least one portion in which electrical resistance varies gradually along one dimension,
   wherein said article comprises a first region, a second region and a third region located between said first and second regions, and wherein said third region is comprised of a plurality of different alloy materials, and
   wherein said alloy materials have been applied in layers and subjected to a heat treatment.

2. An electroconductive article according to claim 1, wherein said third region is comprised of at least five different alloy materials.

3. An electroconductive article according to claim 1, wherein said article comprises a portion of a rotor core for an electric motor.

4. An electroconductive article according to claim 1, wherein said alloy materials comprise copper and nickel.

5. A motor, comprising:
   a rotor core having plural slots formed in an outer portion of the rotor core; and
   a conductor provided in the plural slots respectively;
   wherein a central portion between an upper portion of the conductor and a lower portion of the conductor has an electrical resistance that varies gradually between the upper and lower portions;
   wherein said conductor comprises a first region, a second region and a third region located between said first and second regions, and wherein said third region is comprised of at least five different alloy materials; and
   wherein said alloy materials have been applied in layers and subjected to a heat treatment.

6. A motor according to claim 5, wherein said alloy materials comprise copper and nickel.

7. An electroconductive article, comprising first, second, and third portions, said first portion being formed with copper (Cu) and nickel (Ni) in a ratio of 9:1, said second portion having a plurality of layers each being formed with a different Cu to Ni ratio, and said third portion consisting of copper.

8. An electroconductive article according to claim 7, wherein said second portion includes five layers, a first layer with a first Cu:Ni composition, a second layer with a second Cu:Ni composition, a third layer with a third Cu:Ni composition, a fourth layer with a fourth Cu:Ni composition, and a fifth layer with a fifth Cu:Ni composition.

9. An electroconductive article according to claim 7, wherein said second portion includes five layers, a first layer with Cu:Ni of 9.05:0.95, a second layer with Cu:Ni of 9.10:0.90, a third layer with Cu:Ni of 9.15:0.85, a fourth layer with Cu:Ni of 9.20:0.80, and a fifth layer with Cu:Ni of 9.25:0.75.

10. An electroconductive article, comprising first, second, and third portions, said first portion containing copper (Cu) and nickel (Ni) in a predetermined ratio, said second portion having a plurality of layers each containing Cu and Ni in a different predetermined ratio, and said third portion consisting of copper.

11. An electroconductive article according to claim 10, wherein said second portion includes five layers, a first layer with a first Cu:Ni composition, a second layer with a second Cu:Ni composition, a third layer with a third Cu:Ni composition, a fourth layer with a fourth Cu:Ni composition, and a fifth layer with a fifth Cu:Ni composition.

12. An electroconductive article according to claim 10 wherein said second portion includes five layers, a first layer containing Cu and Ni in a first proportion, a second layer containing Cu and Ni in a second proportion, a third layer containing Cu and Ni in a third proportion, a fourth layer containing Cu and Ni in a fourth proportion, and a fifth layer containing Cu and Ni in a fifth proportion.

13. An electroconductive article comprising a plurality of portions, each of said portions having a resistance value which is different from the resistance value of other portions, and one of said portions being comprised of a plurality of different alloy materials applied in layers and subjected to a heat treatment.

* * * * *